United States Patent Office 3,127,394
Patented Mar. 31, 1964

3,127,394
BOROHYDRIDE REDUCTION OF
KETOPENICILLINS
Yvon G. Perron, Dewitt, and Leonard B. Crast, Jr., North
Syracuse, N.Y., assignors to Bristol-Myers Company,
New York, N.Y., a corporation of Delaware
No Drawing. Filed Apr. 21, 1961, Ser. No. 104,531
6 Claims. (Cl. 260—239.1)

This invention relates to a process for the production of hydroxypenicillins and, more particularly, to the process of converting ketopenicillins to hydroxypenicillins by the use of sodium borohydride or potassium borohydride.

Certain hydroxypenicillins such as α-hydroxybenzylpenicillin are of great value, e.g., by virtue of their activity against both Gram-positive and Gram-negative bacteria. Their preparation by known methods is very inefficient and expensive, however, and there exists a need for a practical method of producing these antibacterial agents in high yield, in a high state of purity and at low cost on a large scale. It is the object of the present invention to provide such a process.

This object has been achieved and there is now provided, according to the present invention, a process of contacting in a liquid medium a member selected from the group consisting of a keptopenicillin and salts thereof with at least one equivalent of a member selected from the group consisting of sodium borohydride and potassium borohydride to produce a member selected from the group consisting of the corresponding hydroxypenicillin and salts thereof. Thus, more specifically, there is provided a process for the production of hydroxypenicillins which comprises contacting in a substantially aqueous medium at a pH greater than about 7 and at a temperature in the range of about −5° C. to about 40° C. a member selected from the group consisting of a ketopenicillin and salts thereof with from one to twelve equivalents of a member selected from the group consisting of sodium borohydride and potassium borohydride to produce a member selected from the group consisting of the corresponding hydroxypenicillin and salts thereof.

In a preferred embodiment of the present invention there is provided a process for the production of hydroxypenicillins which comprises contacting in a substantially aqueous medium at a pH greater than about 7 and at a temperature in the range of about −5° C. to about 40° C. a member selected from the group consisting of ketopenicillins having the formulae

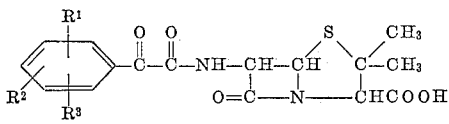

and

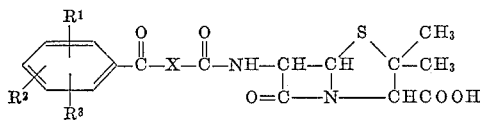

wherein X represents a saturated, bivalent alkylene radical containing from one to ten carbon atoms and $R^1$, $R^2$ and $R^3$ each represent a member selected from the group consisting of hydrogen, fluoro, bromo, chloro, iodo, trifluoromethyl, nitro, amino, (lower)alkylamino, di(lower)alkylamino, carboxyl, allyl, allyloxy, (lower)alkylthio, cyclohexyl, cyclopentyl, cycloheptyl, phenoxy, chlorophenoxy, bromophenoxy, (lower)alkoxyphenoxy, benzyl, phenylethyl, phenylpropyl, phenylthio, chlorophenylthio, (lower)alkylphenylthio, (lower)alkoxyphenylthio, phenyl, chlorophenyl, bromophenyl, (lower)alkylphenyl, (lower)alkoxyphenyl, carbalkoxy, nitrile, (lower)alkyl, (lower)alkoxy, acylamino, acyloxy, hydroxy and sulfamyl and salts thereof with from one to twelve equivalents of a member selected from the group consisting of sodium borohydride and potassium borohydride to produce a member selected from the group consisting of the corresponding hydroxypenicillin and salts thereof.

The preferred species of the present invention are a process for the production of α-hydroxypenicillins which comprises contacting in a liquid medium a member selected from the group consisting of an α-ketopenicillin having the formula

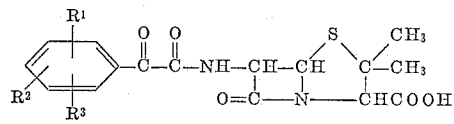

wherein $R^1$, $R^2$ and $R^3$ each represent a member selected from the group consisting of hydrogen, fluoro, bromo, chloro, iodo, trifluoromethyl, nitro, amino, (lower)alkylamino, di(lower)alkylamino, carboxyl, allyl, allyloxy, (lower)alkylthio, cyclohexyl, cyclopentyl, cycloheptyl, phenoxy, chlorophenoxy, bromophenoxy, (lower)alkylphenoxy, (lower)alkoxyphenoxy, benzyl, phenylethyl, phenylpropyl, phenylthio, chlorophenylthio, (lower)alkylphenylthio, (lower)alkoxyphenylthio, phenyl, chlorophenyl, bromophenyl, (lower)alkylphenyl, (lower)alkoxyphenyl, carbalkoxy, nitrile, (lower)alkyl, (lower)alkoxy, acylamino, acyloxy, hydroxy and sulfamyl and salts thereof with at least one equivalent of a member selected from the group consisting of sodium borohydride and potassium borohydride to produce a member selected from the group consisting of the corresponding α-hydroxypenicillin and salts thereof, and, most specifically, a process for the production of α-hydroxybenzylpenicillin which comprises contacting in a substantially aqueous medium at a pH greater than about 7 and at a temperature in the range of about −5° C. to about 40° C. a member selected from the group consisting of 6-(phenylglyoxylamido)penicillanic acid and salts thereof with from one to twelve equivalents of sodium borohydride to produce a member selected from the group consisting of α-hydroxybenzylpenicillin and salts thereof.

Also forming a part of the present invention are the valuable chemical intermediates comprising acids having the formula

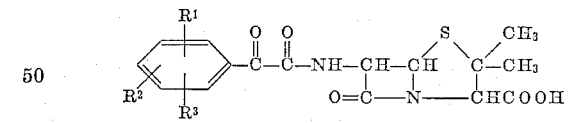

wherein $R^1$, $R^2$ and $R^3$ each represent a member selected from the group consisting of hydrogen, fluoro, bromo, chloro, iodo, trifluoromethyl, nitro, amino, (lower)alkylamino, di(lower)alkylamino, carboxyl, allyl, allyloxy, (lower)alkylthio, cyclohexyl, cyclopentyl, cycloheptyl, phenoxy, chlorophenoxy, bromophenoxy, (lower)alkylphenoxy, (lower)alkoxyphenoxy, benzyl, phenylethyl, phenylpropyl, phenylthio, chlorophenylthio, (lower)alkylphenylthio, (lower)alkoxyphenylthio, phenyl, chlorophenyl, bromophenyl, (lower)alkylphenyl, (lower)alkoxyphenyl, carbalkoxy, nitrile, (lower)alkyl, (lower)alkoxy, acylamino, acyloxy, hydroxy and sulfamyl; and salts thereof. Among these, the preferred intermediate is 6-(phenylglyoxylamido)penicillanic acid and salts thereof.

The ketopenicillins which are the reagents used in the process of the present invention are prepared by reaction of organic keto-carboxylic acids, or their functional equivalents as acylating agents for a primary amino group, with 6-aminopenicillanic acid according to the processes disclosed by Doyle et al. in U.S. Patents 2,941,995 and 2,951,839, and by Perron et al., J. Amer. Chem. Soc., 82, 3934–3938 (1960), and Antibiotics Annual, 1959–1960, pages 107–110.

The keto-carboxylic acids thus utilized may contain, as additional substituents, one or more fluoro, bromo, chloro, iodo, trifluoromethyl, nitro, amino, alkylamino, dialkylamino, carboxyl, allyl, allyloxy, (lower)alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)-alkylphenylthio, (lower)alkoxyphenylthio, etc.] and aryl [including phenyl, chlorophenyl, bromophenyl, (lower)-alkylphenyl, (lower)alkoxyphenyl, etc.] carbalkoxy, nitrile, alkyl, alkoxy, acylamino, acyloxy, hydroxy, and sulfamyl groups.

These acids have the formulae

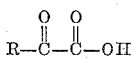

and

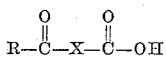

wherein X represents straight and branched chain, saturated bivalent alkylene radicals containing from one to ten carbon atoms inclusive and R is a benzene ring which may contain one, two or three of the substituents set forth above.

A preferred embodiment of the present invention is the process for the reduction to the corresponding penicillin of the ketopenicillin having the formula

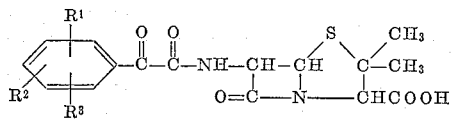

wherein $R^1$, $R^2$ and $R^3$ each represent a member selected from the group consisting of hydrogen, nitro, amino, (lower)alkyl, (lower)alkylamino, di(lower)alkylamino, (lower)alkoxy, acylamino (where the acylating agent is an aliphatic carboxylic acid containing from one to ten carbon atoms inclusive and thus may also be named (lower)alkanoylamino), chloro, bromo, iodo, fluoro, trifluoromethyl, allyl, allyloxy, hydroxy, sulfamyl, (lower)-alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)alkylphenylthio, (lower)alkoxyphenylthio, etc.] and aryl [including phenyl, chlorophenyl, bromophenyl, (lower)alkylphenyl, (lower)alkoxyphenyl, etc.], and salts thereof, including metallic salts such as sodium, potassium, calcium and aluminum, the ammonium salt and substituted ammonium salts, e.g., salts of such amines as trialkylamines, including triethylamine, procaine, dibenzylamine, N-benzyl-beta-phenethylamine, 1-ephenamine, N,N′-dibenzylethylenediamine, dehydroabietylamine, N,N′ - bis - dehydroabietylethylenediamine, N-(lower)alkylpiperidines, e.g., N-ethylpiperidine, and other amines which have been used to form salts with benzylpenicillin. The α-ketopenicillins having the structure set forth in the preceding sentence are novel intermediates useful for the preparation of α-hydroxypenicillins and form a part of the present invention. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with "(lower)alkyl." The term "aryl" as used herein (in the terms "aryl," "arylthio" and "aryloxy") refers to the phenyl radical per se and to substituted phenyl radicals of the formula:

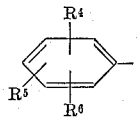

wherein $R^4$, $R^5$ and $R^6$ each represent a member selected from the group consisting of hydrogen, fluoro, chloro, bromo, iodo, trifluoromethyl, (lower)alkyl, (lower)alkoxy, hydroxy, nitro and amino.

The keto-carboxylic acids used as starting reagents are prepared by the general or specific methods disclosed in the literature for such compounds. Thus, substituted phenylglyoxylic acids are prepared from the appropriate substituted benzoic acid via its acid chloride according to the process described in Organic Syntheses 24, 14 (1944) for the reaction of benzoyl chloride with cuprous cyanide followed by acid hydrolysis to produce phenylglyoxylic acid. Examples of such substituted phenylglyoxylic acids, with literature reference to their method of preparation, include the following:

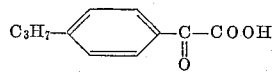

Weygand, Organic Preparations, p. 447

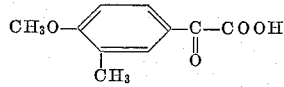

Ber., 76, 312 (1943)

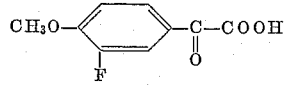

Monatshefte Fur Chemie, 86, 513 (1955)

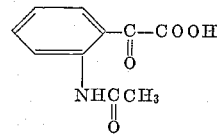

J. Am. Chem. Soc., 46, 1704 (1924)
J. Chem. Soc., 2907 (1926)

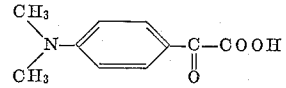

Ber., 10, 2081 (1877)
Ber., 42, 3489 (1909)

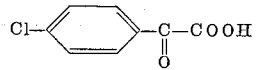

Ber., 80, 298 (1947)

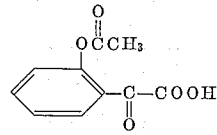

Ann., 368, 81 (1909)

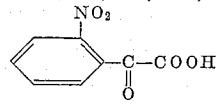

Ber., 44, 2418 (1911)
Ber., 23, 1557 (1890)

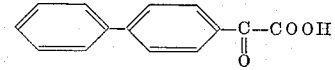

J. Am. Chem. Soc., 65, 1725 (1943)

The starting ω-benzoylalkanoic acids of the present invention may be prepared by a variety of synthetic methods common in the art, for example, one may employ a Friedel-Craft type reaction with the appropriate benzene compound and either an acid anhydride or an acid chloride. Detailed discussions of these type reactions are found in treatises such as "Organic Reaction," volume 5 (1959), R. Adams, Ed., John Wiley and Sons Inc., publishers, and "Anhydrous Aluminum Chloride in Organic Chemistry" (1941), C. A. Thomas, Reinhold Publishing Corp., New York, N.Y.

Specific examples of the conversion of such ω-benzoylalkanoic acids to the corresponding ketopenicillin are the following:

6-(5-BENZOYLVALERAMIDO)-PENICILLANICA ACID

Isobutyl chloroformate (0.05 mole) is added to a chilled solution of 5-benzoylvaleric acid (0.05 mole) and triethylamine (0.05 mole) in 125 ml. of acetone and 250 ml. of p-dioxane and the resulting mixture is stirred for approximately thirty minutes in the cold. A chilled solution of 6-aminopenicillanic acid (0.05 mole) and triethylamine (0.05 mole) in 250 ml. of water is then added to the above acylating mixture and stirring is contained for approximately one hour in the cold. Upon completion of the stirring period, the reaction mixture is made slightly basic (pH 8) by the addition of a saturated sodium bicarbonate solution and is then extracted with ether. The ethereal extract is discarded, the alkaline aqueous solution is covered with ether and then is acidified (pH 2) with 6 N HCl. The acidified aqueous solution is extracted twice with ether and these are combined. The combined extracts containing the products 6-(5-benzoylvaleramido)penicillanic acid, are dried rapidly over anhydrous sodium sulfate and filtered. The above penicillanic acid is isolated in the form of its triethylamine salt by the addition of triethylamine (0.05 mole). After trituration with ethyl acetate, this salt is dried in vacuo over $P_2O_5$, recovered as a water soluble powder and found to weight 5 grams (0.005 mole), to contain the β-lactam structure as shown by infrared analysis, to inhibit the growth of *Staph. aureus* Smith at a concentration of 0.2 mcg./ml. and to exhibit versus *Staph. aureus* Smith upon intramuscular injection in mice a $CD_{50}$ of 3.2 mgm./kg.

6-(3-BENZOYLPROPIONAMIDO)-PENICILLANIC ACID

After the addition of isobutyl chloroformate (0.03 mole) to a chilled (4° C.) solution of 3-benzoylpropionic acid (0.03 mole) and triethylamine (0.03 mole) in 40 ml. of p-dioxane and 10 ml. of acetone, the reaction mixture is stirred for approximately thirty minutes in the cold. This reaction mixture is then treated with a cool (5° C.) solution of 6-aminopenicillanic acid (0.03 mole) and triethylamine (0.03 mole) in 40 ml. of water and stirring is continued for an additional hour. Upon completion of the stirring period, the reaction mixture is made slightly basic (pH 8) by the addition of a saturated sodium bicarbonate solution and is then extracted with ether. The ethereal extract is discarded, the aqueous alkaline solution is covered with ether and then is acidified (pH 2) with 6 N HCl. The acidified aqueous solution is extracted twice with ether and these extracts are combined. These combined extracts are washed with water, dried over anhydrous sodium sulfate and filtered. The 6-(3-benzoylpropionamido)penicillanic acid is precipitated in the form of its potassium salt by the addition of 15 ml. of a 40% butanolic solution of potassium 2-ethylhexanoate. After trituration with ether, this potassium salt is dried in vacuo over $P_2O_5$, recovered as a water-soluble powder and found to weight 3.6 grams (0.0087 mole), to contain the β-lactam structure as shown by infrared analysis and to inhibit the growth of *Staph. aureus* Smith at a concentration of 0.1 mcg./ml. and to exhibit versus *Staph. aureus* Smith upon intramuscular injection in mice a $CD_{50}$ of 9 mgm./kg.

6-[3-(2,4,6-TRIMETHYLBENZOYL)PROPIONAMIDO]PENICILLANIC ACID

Isobutyl chloroformate (0.1 mole) is added to a cool (0°–3° C.) solution of 3-(2,4,6-trimethylbenzoyl)propionic acid (0.1 mole) and triethylamine (0.1 mole) in 250 ml. of acetone and 500 ml. of dioxane and the resulting mixture is stirred for thirty minutes in the cold. This mixture is then treated with a cool solution of 6-aminopenicillanic acid (0.1 mole) and triethylamine (0.1 mole) in 500 ml. of water and is stirred in the cold for an additional hour. The pH of the reaction mixture is adjusted to approximately 8 by the addition of a saturated solution of sodium bicarbonate and is then extracted with ether. Following the ether extraction, the aqueous solution is covered with ether and is acidified to a pH of about 2 by the addition of 6 N HCl. The acidified aqueous solution is then extracted twice with ether. The combined extracts, in which the product 6-[3-(2,4,6-trimethylbenzoyl)propionamido]penicillanic acid is contained, are washed with water, dried over anhydrous sodium sulfate and filtered. The addition of 40 ml. of 40 percent butanolic solution of potassium 2-ethylhexanoate causes the precipitation of the potassium salt of the above penicillanic acid. After trituration with ether, this potassium salt is dried in vacuo over $P_2O_5$ and recovered as a water-soluble powder which inhibits the growth of *Staph. aureus* Smith at concentrations of 0.001 percent by weight.

6-[4-(2,4-DICHLOROBENZOYL)BUTYRAMIDO]-PENICILLANIC ACID

A chilled solution of isobutyl chloroformate (0.1 mole), triethylamine (0.1 mole) and 4-(2,4-dichlorobenzoyl)-butyric acid (0.1 mole) is stirred for approximately thirty minutes after formation in the cold. This mixture is then treated with a cold (0°–3° C.) solution of 6-aminopenicillanic acid (0.1 mole) and triethylamine (0.1 mole) in 500 ml. of water and is stirred in the cold for an additional hour. This reaction mixture is made slightly basic (pH 8) by the addition of a saturated solution of sodium bicarbonate and then is extracted with ether. The extracted alkaline aqueous solution is covered with ether, is acidified (pH 2) with 6 N HCl, and then is extracted twice with ether. The combined extracts, in which the product 6-[4-(2,4-di-chlorobenzoyl)butyramido]penicillanic acid is contained, are washed with water, dried over anhydrous sodium sulfate, and filtered. The addition of 40 ml. of a 40 percent butanolic solution of potassium 2-ethylhexanoate causes the precipitation of the potassium salt of the above penicillanic acid. After trituration with ether, this salt is dried in vacuo over $P_2O_5$ and recovered as a water soluble powder which inhibits the growth of *Staph. aureus* Smith at concentrations of 0.001 percent by weight.

The process of the present invention is carried out using sodium borohydride or potassium borohydride and preferably the former. Sodium borohydride ($NaBH_4$) is a white to gray-white microcrystalline powder containing four moles of available hydrogen per mole. It is stable in dry air, decomposes very slowly in moist air and reacts inappreciably with water at room temperature but rapidly at 50° C. or in the presence of acids or certain metal cations such as Co++ and Ni++. Preferred solvents for use with sodium borohydride are water (55), alcohols [e.g. methanol, ethanol (4 RS), isopropyl alcohol (0.25 RS)], amines [e.g., isopropylamine (10), morpholine (1), pyridine (3)], dioxane, tetrahydrofuran (SS), and dimethyl-Cellosolve (0.8). The figures in parentheses are the approximate solubilities in grams per 100 g. solvent at 20° C.; RS means reacts slowly; SS means slightly soluble. Sodium borohydride is generally insoluble in ethers, hydrocarbons and alkyl chlorides. In general, sodium borohydride will reduce only the carbonyl group of aldehydes, ketones and acid chlorides. It does not react with acids, esters, anhydrides, olefinic double bonds, nitro compounds, nitriles, alkyl halides nor aryl halides. Sodium and potassium borohydride have been used to reduce keto groups to alcoholic hydroxyl groups in simpler compounds than the penicillins used herein as disclosed by Gaylord, Reduction with Complex Metal Hydrides, Interscience Publishers, Inc., New York, 1956 and in the references cited therein. Streptomycin was reduced to dihydrostreptomycin by Kaplan, U.S. Patent 2,790,792.

The reduction of ketopenicillins in the process of the present invention is preferably carried out in water, an alcohol or mixtures thereof and the ketopenicillin may be in solution or suspension. It is preferred to reduce the ketopenicillin in the form of an aqueous solution of one of its salts, e.g., an alkali metal salt such as sodium or potassium. The reaction may be carried out from $-40°$ C. to reflux temperature, but the use of a temperature from $-5°$ to $40°$ C. is satisfactory and preferred. It is helpful, but not essential, to maintain a pH between about 7 and 9 during the course of the addition of the sodium borohydride to the solution or suspension of ketopenicillin, i.e., during the reaction, as by the periodic addition of an acid, e.g., acetic acid. Sodium borohydride has a molecular weight of 37.85 and, in this reaction, an equivalent weight of 9.46. It is convenient and inexpensive, but not essential, to use an excess of sodium borohydride over the theoretical amount; thus use is normally made for each mole of ketopenicillin of 0.25 to 3.0 moles $NaBH_4$. At the conclusion of the reaction, any remaining unreacted sodium borohydride is preferably destroyed by addition of aqueous acid. Such acidification also converts the hydroxypenicillin which is the product of the reaction to its acid form. The hydroxypenicillin is then isolated by any of the customary techniques, e.g., by extraction of the acid form into a water-immiscible solvent followed by precipitation as the potassium salt by the addition of a solution of potassium 2-ethylhexanoate in n-butanol.

The hydroxypenicillins produced by the process of the present invention contain a newly formed asymmetric carbon atom and are therefore a mixture of two diastereoisomers which may be separated into the two pure components, if desired, by the usual methods such as fractional recrystallization of a salt. Both isomers are biologically active and both are included within the scope of the present invention as well as mixtures thereof.

Further understanding of the invention may be obtained by reference to the following examples which are illustrative only and are not the exclusive embodiment of the invention.

*Example 1*

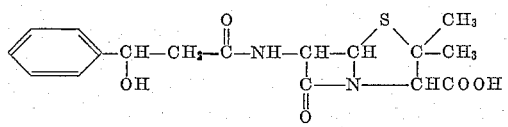

(a) *Potassium 6-(3-benzoylpropionamido)pencillanate.*—To a solution of 35.6 g. (0.2 mole) β-benzoylpropionic acid in 400 ml. tetrahydrofuran and 30 ml. triethylamine there was added 20 ml. ethyl chloroformate dropwise at $-5°$ C. After stirring for 15 minutes at $-5°$ C. there was added rapidly a solution of 43.2 g. (0.2 mole) of 6-aminopenicillanic acid in 200 ml. water and 30 ml. triethylamine at such a rate that the temperature did not exceed 5° C. The ice-salt-acetone bath was then removed and vigorous stirring was continued for 90 minutes. To the resulting clear solution there was added 500 ml. distilled water. After two extractions with 800 ml. methyl isobutyl ketone, the aqueous phase was acidified under 600 ml. methyl isobutyl ketone in an icebath to pH 2. After shaking, the methyl isobutyl ketone phase containing the product, 6-(3-benzoylpropionamido)penicillanic acid, was separated, washed twice with 250 ml. portions of distilled water, dried over anhydrous $Na_2SO_4$ and filtered. The penicillin acid was converted to its potassium salt by the addition of 170 ml. of a 40% by weight solution of potassium 2-ethylhexanoate in dry n-butanol. Following removal of the solvent at 35° C. by distillation in vacuo until crystallization began and further distillation in vacuo at 28° C., the product, potassium 6-(3-benzoylpropionamido)penicillanate, precipitated as a crystalline solid and was collected by filtration, washed thoroughly with dry acetone and found to weigh 43 g. and to melt with decomposition at 194° C. Recrystallization of twenty grams from a mixture of 300 ml. n-butanol and 50 ml. water gave 16.8 g., M.P. 214° C.

(b) *Potassium 6-(4-hydroxy-4-phenylbutyramido)penicillanate.*—To an ice-cold solution of 20.8 g. (0.05 mole) potassium 6-(3-benzoylpropionamido)penicillanate in 100 ml. distilled water and 14.6 g. (0.05 mole) sodium acetate trihydrate there was added 4.8 g. (0.127 mole) $NaBH_4$ in portions such that the temperature did not exceed 10° C. and no reaction mixture was lost by foaming. During the addition, which required about one hour, the pH was kept at 8 by the dropwise addition of glacial acetic acid. The mixture was then stirred in the ice bath for one hour and, after adding 250 ml. ether, was then adjusted to pH 2 by the addition of 40% $H_3PO_4$. The ethereal extract containing the product, 6-(4-hydroxy-4-phenylbutyramido)penicillanic acid, was dried briefly over anhydrous $Na_2SO_4$ and filtered. The addition of 30 ml. of 40% potassium 2-ethylhexanoate in n-butanol precipitated the product as the potassium salt as an oil which began to crystallize on scratching. Crystallization was accelerated by the addition of 100 ml. n-butanol and 100 ml. dry acetone. The potassium 6-(4-hydroxy-4-phenylbutyramido)penicillanate was collected by filtration, found to weigh 8.5 g., to contain the β-lactam structure and to differ from the starting ketopenicillin as shown by infrared analysis and to melt with decomposition at 212°–214° C.

*Example 2*

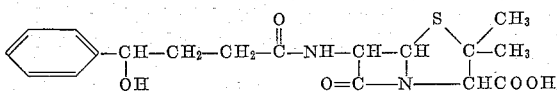

(a) *Benzoylacetic acid.*—Ethyl benzoylacetate (192 g., 1.0 mole) was stirred at room temperature for one hour in a solution of sodium hydroxide (80 g., 2.0 mole) in 1.8 l. water and extracted three times with 700 ml. ether. After filtration through diatomaceous earth, the residual ether was removed under reduced pressure and the aqueous solution was acidified to pH 2 at 10°–15° C. The crystalline benzoylacetic acid which precipitated was collected by filtration, dried and found to weight 50 g. and to melt with decomposition at 100° C. Recrystallization from ethyl acetate gave 20 g., M.P. 102°–103° C.

A second run using 1.5 moles ester and a reaction time of 3 hours gave, after recrystallization from benzene, 100 g., M.P., 100°–102° C.

(b) *α-Benzoylacetyl chloride.*—To a stirred, cold suspension in 100 ml. $CH_2Cl_2$ of 32.8 g. (0.2 mole) benzoylacetic acid containing two or three drops of pyridine there was added dropwise a solution of 26 g. (0.21 mole) $SOCl_2$ in 100 ml. $CH_2Cl_2$. After this addition the ice bath was removed and the slurry was stirred for 60 minutes and then gently refluxed for 30 minutes. Finally the methylene chloride and any residual thionyl chloride were removed by distillation in vacuo leaving the α-benzoylacetyl chloride as yellow crystals which were then dissolved in 200 ml. $CH_2Cl_2$ and used in the next reaction.

(c) *Potassium 6-(α-benzoylacetamido)penicillanate.*—The solution of α-benzoylacetyl chloride (0.2 mole) in 200 ml. $CH_2Cl_2$ was added at 5° C. over a period of thirty minutes to a solution of 43.2 g. (0.2 mole) of 6-aminopenicillanic acid in 400 ml. $CH_2Cl_2$ and 75 ml. triethylamine and then the ice bath was removed and stirring was continued for ninety minutes. The resulting orange solution was extracted three times with 200 ml. portions of water and the combined aqueous extracts were washed three times with 500 ml. portions of ether. The aqueous phase was covered with 300 ml. ether and acidified in the cold to pH 2. After adding 200 ml. ether used to rinse the flask, the ether containing the product, 6-(α-benzoylacetamido)penicillanic acid, was washed twice with 200 ml. cold water, dried 15 minutes over anhydrous $Na_2SO_4$ and filtered. To the filtrate there was added 100 ml. of 40% n-butanolic potassium 2-ethylhexanoate to precipitate 36 g. potassium 6-(α-benzoylacetamido)penicillanate, M.P. 205° C. (dec.).

(d) *Potassium 6-(3-hydroxy-3-phenylpropionamido)penicillanate.*—This product was prepared according to the procedure of Example 1 using a solution of 20.0 g. (0.05 mole) potassium 6-(α-benzoylacetamido)penicillanate in 100 ml. distilled water and 14.6 g. sodium acetate trihydrate, reducing with 4.8 g. (0.127 mole) $NaBH_4$ and adjusting the pH to 8 with glacial acetic acid. After converting the free acid to the potassium salt, the latter did not crystallize from ether so n-butanol was added until a clear solution was obtained which was then distilled in vacuo until crystallization began. There was thus obtained 2 g. potassium 6-(3-hydroxy-3-phenylpropionamido)penicillanate, M.P. 205° C. (dec.). By infrared analysis the carbonyl group was shown to have been reduced and the β-lactam structure was shown to have remained unchanged.

*Example 3*

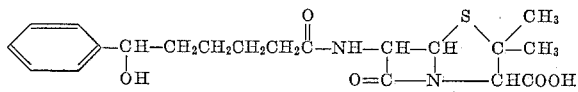

(a) *Potassium 6-(5-benzoylvaleramido)penicillanate.*—Following the procedure of Example 2(c), a solution of 41.2 g. (0.2 mole) of 5-benzoylvaleric acid in 200 ml. tetrahydrofuran and 30 ml. triethylamine was reacted first with 21.6 g. (0.2 mole) ethyl chloroformate and then with 43.2 g. (0.2 mole) 6-aminopenicillanic acid in 100 ml. water and 30 ml. triethylamine to produce 80 g. crude potassium 6-(5-benzoylvaleramido)penicillanate. This salt was converted to N,N'-dibenzylethylenediamine bis-6-(5-benzoylvaleramido)penicillanate by dissolving it in 500 ml. water, filtering, adding 36 g. (0.1 mole) N,N'-dibenzylethylenediamine diacetate and collecting, washing with water and drying in air the 70 g. N,N'-dibenzylethylenediamine bis - 6 - (5 - benzoylvaleramido)penicillanate which precipitated. After shaking this amine salt with 500 ml. methyl isobutyl ketone, 400 ml. water and 30 ml. 40% $H_3PO_4$, the methyl isobutyl ketone phase containing 6-(5-benzoylvaleramido)penicillanic acid was washed twice with 200 ml. portions of water, dried briefly over $Na_2SO_4$ and filtered. To the filtrate there was added 50 ml. of 40% potassium 2-ethylhexanoate in n-butanol to convert the penicillin to its potassium salt. After removal of the solvents under reduced pressure followed by the addition of 300 ml. dry acetone and scratching there was obtained crystalline potassium salt which was collected by filtration, washed with acetone and finally with mixed lower alkanes (Skellysolve B), dried in vacuo and found to weigh 16.5 g.

The identical compound (38 g.) was also prepared from 0.2 mole 5-benzoylvaleric acid by the anhydrous acid chloride method described above in Examples 2(b) and (c).

(b) *Potassium 6-(5-hydroxy-5-phenylvaleramido)penicillanate.*—This product was prepared from 35 g. (0.08 mole) potassium 6-(5-benzoylvaleramido)penicillanate in 200 ml. water by reduction with 4.8 g. $NaBH_4$ by the procedure used above in Example 1(b) except that no sodium acetate was used. The product, potassium 6-(5-hydroxy-5-phenylvaleramido)penicillanate, was isolated as amorphous, hygroscopic material from dry ether and found to weigh 12 g.

*Example 4*

(a) *Potassium 6-(phenylglyoxylamido)penicillanate.*—To an ice-cold, stirred solution of 64.8 g. (0.3 mole) 6-aminopenicillanic acid and 126 g. (1.5 mole) $NaHCO_3$ in 400 ml. water and 100 ml. of acetone there was added a solution of 51 g. (0.31 mole) of phenylglyoxylic acid chloride in 200 ml. of acetone at such a rate as to keep the maximum temperature 10° C. After the addition the ice bath was removed and after an additional two hours the product was converted to its acid form by acidification, extracted into ether and there converted to its potassium salt by the addition of potassium 2-ethylhexanoate in n-butanol. The product, potassium 6-(phenylglyoxylamido)penicillanate was precipitated as a solid by the addition of dry diethyl ether, collected by filtration and found to weigh 60 g.

(b) *Potassium 6-(α-hydroxy-α-phenylacetamido)penicillanate.*—To a cooled, stirred solution of 60 g. potassium 6 - phenylglyoxylamido)penicillanate, 400 ml. water and 45 g. sodium acetate trihydrate at 5° C. there was added in portions 13.5 g. sodium borohydride sufficiently slowly so that the temperature did not exceed 10° C. Alternately during the addition glacial acetic acid was added in amounts sufficient to maintain the pH between 7 and 9. Occasionally ether was added to lower surface tension and prevent foaming. After all the hydride had been added the solution was stirred an additional ten minutes, transferred to a separatory funnel and extracted with one 500 ml. portion of ether. The aqueous phase was separated, covered with 400 ml. ether and acidified in the cold (ice bath) slowly and with vigorous stirring to pH 2 with 40% $H_3PO_4$. The ethereal extract containing the desired 6-(α-hydroxy-α-phenylacetamido)penicillanic acid (also called α-hydroxybenzylpenicillin) was washed twice with 400 ml. portions of distilled water, dried briefly over anhydrous sodium sulfate, and filtered. Addition of 40 ml. of 40% potassium 2-ethylhexanoate in n-butanol followed by the addition of 200 ml. n-butanol converted the acid to its potassium salt and initiated its slow crystallization. All of the product, potassium 6-(α-hydroxy - α - phenylacetamido)penicillanate, was obtained as a crystalline solid after removal of the ether and some of the butanol by distillation in vacuo, collected by filtration, washed with n-butanol and then several times with acetone and found to weigh 10 g. and to melt with decomposition at 219°–220° C. after azeotropic recrystallization from butanol-water (4:1).

*Analysis.*—Calculated for $C_{16}H_{17}N_2O_5SK$: C, 49.50; H, 4.42. Found: C, 49.85; H, 4.91.

The product is obtained as a mixture of diastereoisomers which are separated, if desired, by fractional recrystallization, e.g., of the salt from acetone-water.

*Example 5*

In the procedure of Example 1(b) the potassium 6-(3-benzoylpropionamido)penicillanate is replaced by an equimolar weight of the potassium salt of the acids 4-(2,4-dichlorobenzoyl)butyric acid,
3-(2,4-dihydroxybenzoyl)propionic acid,
3-(2,4,6-trimethylbenzoyl)propionic acid,
6-[4-(4-ethoxybenzoyl)butyramido]penicillanic acid,
6-(9-benzoylpelargionamido)penicillanic acid,
6-[5-(4-methoxybenzoyl)valeramido]penicillanic acid,
6-[3-(4-t-butylbenzoyl)propionamido]penicillanic acid,
6-[4-(3,4-dihydroxybenzoyl)butyramido]penicillanic acid,
6-[8-(4-ethoxybenzoyl)caprylamido]penicillanic acid,
6-(8-benzoylcaprylamido)penicillanic acid,
6-[3-(4-acetamidobenzoyl)propionamido]penicillanic acid,
6-[3-(3-diethylaminobenzoyl)propionamido]penicillanic acid, and
6-[3-(4-bromobenzoyl)propionamido]penicillanic acid, respectively, which are prepared by the methods set forth above, to produce the acids 6-[5-hydroxy-5-(2,4-dichlorophenyl)valeramido]penicillanic acid,
6-[4-hydroxy-4-(2,4-dihydroxyphenyl)butyramido]penicillanic acid,
6-[4-hydroxy-4-(2,4,6-trimethylphenyl)butyramido]penicillanic acid,
6-[5-hydroxy-5-(4-ethoxyphenyl)valeramido]penicillanic acid,
6-[10-hydroxy-10-phenylcapramido]penicillanic acid,
6-[5-hydroxy-6-(4-methoxyphenyl)caproamido]penicillanic acid,
6-[4-hydroxy-4-(4-t-butylphenyl)butyramido]penicillanic acid,
6-[5-hydroxy-5-(3,4-dihydroxyphenyl)valeramido]penicillanic acid,
6-[9-hydroxy-9-(4-ethoxyphenyl)pelargonamido]penicillanic acid,
6-[9-hydroxy-9-phenylpelargonamido)penicillanic acid,
6-[4-hydroxy-4-(3-diethylaminophenyl)butyramido]-penicillanic acid, and
6-[4-hydroxy-4-(4-bromophenyl)butyramido]penicillanic acid, respectively, which are isolated as their solid, water-soluble potassium salts and are found to inhibit Gram-positive bacteria at low concentrations.

*Example 6*

In the procedure of Example 4(b) the potassium 6-(phenylglyoxyamido)penicillanate is replaced by an equimolar weight of the potassium salt of the acids 6-(2-methoxyphenylglyoxyamido)penicillanic acid,
6-(4-isopropylphenylglyoxyamido)penicillanic acid,
6-(4-chlorophenylglyoxyamido)penicillanic acid,
6-(2,4-dichlorophenylglyoxyamido)penicillanic acid,
6-(2,4,6-trimethylphenylglyoxyamido)penicillanic acid,
6-(4-sulfamylphenylglyoxyamido)penicillanic acid,
6-(3,4-dimethoxyphenylglyoxyamido)penicillanic acid,
6-(2,6-dimethoxyphenylglyoxyamido)penicillanic acid,
6-(3-methylphenylglyoxyamido)penicillanic acid,
6-(4-dimethylaminophenylglyoxyamido)penicillanic acid,
6-(4-methoxyphenylglyoxyamido)penicillanic acid,
6-(3,4,5-trimethoxyphenylglyoxyamido)penicillanic acid,
6-(2-nitrophenylglyoxyamido)penicillanic acid,
6-(4-methylaminophenylglyoxyamido)penicillanic acid,
6-(2-acetamidophenylglyoxyamido)penicillanic acid,
6-(2,4-dimethylphenylglyoxyamido)penicillanic acid,
6-(3-bromophenylglyoxyamido)penicillanic acid,
6-(2-iodophenylglyoxyamido)penicillanic acid,
6-(2,5-dihydroxyphenylglyoxyamido)penicillanic acid,
6-(3,5-dinitrophenylglyoxyamido)penicillanic acid,
6-(3,4-dichlorophenylglyoxyamido)penicillanic acid,
6-(4-hydroxyphenylglyoxyamido)penicilllanic acid,
6-(2-fluorophenylglyoxyamido)penicillanic acid,
6-(4-aminophenylglyoxyamido)penicillanic acid,
6-(4-n-propylphenylglyoxyamido)penicillanic acid,
6-(4-methoxy-3-methylphenylglyoxyamido)penicillanic acid,
6-(4-methoxy-3-fluorophenylglyoxyamido)penicillanic acid,
6-(2-acetoxyphenylglyoxyamido)penicillanic acid,
6-(4-phenylphenylglyoxyamido)penicillanic acid,
6-(4-trifluoromethylphenylglyoxyamido)penicillanic acid,
6-(4-phenoxyphenylglyoxyamido)penicillanic acid,
6-(2-benzylphenylglyoxyamido)penicillanic acid, and
6-(2-cyanophenylglyoxyamido)penicillanic acid, respectively, which are prepared by the methods set forth above to produce the acids α-hydroxy-2-methoxybenzylpenicillin,
α-hydroxy-4-isopropylbenzylpenicillin,
α-hydroxy-4-chlorobenzylpenicillin,
α-hydroxy-2,4-dichlorobenzylpenicillin,
α-hydroxy-2,4,6-trimethylbenzylpenicillin,
α-hydroxy-4-sulfamylbenzylpenicillin,
α-hydroxy-3,4-dimethoxybenzylpenicillin,
α-hydroxy-2,6-dimethoxybenzylpenicillin,
α-hydroxy-3-methylbenzylpenicillin,
α-hydroxy-4-dimethylaminobenzylpenicillin,
α-hydroxy-4-methoxybenzylpenicillin,
α-hydroxy-3,4,5-trimethoxybenzylpenicillin,
α-hydroxy-2-nitrobenzylpenicillin,
α-hydroxy-4-methylaminobenzylpenicillin,
α-hydroxy-2-acetamidobenzylpenicillin,
α-hydroxy-2,4-dimethylbenzylpenicillin,
α-hydroxy-3-bromobenzylpenicillin,
α-hydroxy-2-iodobenzylpenicillin,
α-hydroxy-2,5-dihydroxybenzylpenicillin,
α-hydroxy-3,5-dinitrobenzylpenicillin,
α-hydroxy-3,4-dichlorobenzylpenicillin,
α-hydroxy-4-hydroxybenzylpenicillin,
α-hydroxy-2-fluorobenzylpenicillin,
α-hydroxy-4-aminobenzylpenicillin,
α-hydroxy-4-n-propylbenzylpenicillin,
α-hydroxy-4-methoxy-3-methylbenzylpenicillin,
α-hydroxy-4-methoxy-3-fluorobenzylpenicillin,
α-hydroxy-2-acetoxybenzylpenicillin,
α-hydroxy-4-phenylbenzylpenicillin,
α-hydroxy-4-trifluoromethylbenzylpenicillin,
α-hydroxy-4-phenoxybenzylpenicillin,
α-hydroxy-2-benzylbenzylpenicillin, and
α-hydroxy-2-cyanobenzylpenicillin, respectively, which are isolated as their solid, water-soluble potassium salts and are found to inhibit both Gram-positive and Gram-negative bacteria at low concentrations.

We claim:

1. A process for the production of hydroxypenicillins which comprises contacting in a substantially aqueous medium at a pH greater than about 7 a ketopenicillin with at least one equivalent of a member selected from the group consisting of sodium borohydride and potassium borohydride to produce the corresponding hydroxypenicillin.

2. A process for the production of hydroxypenicillins which comprises contacting in a substantially aqueous medium at a pH greater than about 7 and at a temperature in the range of about —5° C. to about 40° C. a ketopenicillin with from one to twelve equivalents of a member selected from the group consisting of sodium borohydride and potassium borohydride to produce the corresponding hydroxypenicillin.

3. A process for the production of hydroxypenicillins which comprises contacting in a substantially aqueous medium at a pH greater than about 7 and at a temperature in the range of about —5° C. to about 40° C. ketopenicillins having the formulae

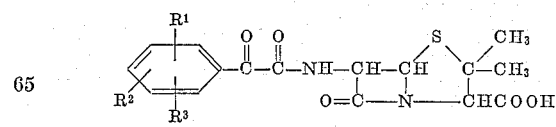

and

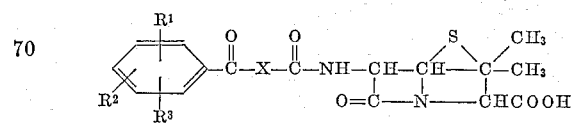

wherein X represents a saturated, bivalent alkylene radical containing from one to ten carbon atoms, and $R^1$, R² and R³ each represent a member selected from the group consisting of hydrogen, fluoro, bromo, chloro, iodo, trifluoromethyl, nitro, amino, (lower)alkylamino, di(lower)alkylamino, carboxyl, allyl, allyloxy, (lower)alkylthio, cyclohexyl, cyclopentyl, cycloheptyl, phenoxy, chlorophenoxy, bromophenoxy, (lower)alkylphenoxy, (lower)alkoxyphenoxy, benzyl, phenylethyl, phenylpropyl, phenylthio, chlorophenylthio, (lower)alkylphenylthio, (lower)alkoxyphenylthio, phenyl, chlorophenyl, bromophenyl, (lower)alkylphenyl, (lower)alkoxyphenyl, carbalkoxy, nitrile, (lower)alkyl, (lower)alkoxy, (lower)alkanoylamino, hydroxy and sulfamyl with from one to twelve equivalents of a member selected from the group consisting of sodium borohydride and potassium borohydride to produce the corresponding hydroxypenicillin.

4. A process for the production of α-hydroxypenicillins which comprises contacting in a substantially aqueous medium at a pH greater than about 7 and at a temperature in the range of about —5° C. to about 40° C. an α-ketopenicillin having the formula

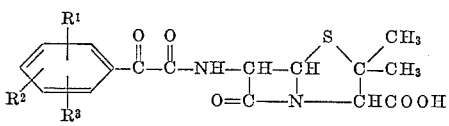

wherein R¹, R² and R³ each represent a member selected from the group consisting of hydrogen, fluoro, bromo, chloro, iodo, trifluoromethyl, nitro, amino, (lower)alkylamino, di(lower)alkylamino, carboxyl, allyl, allyloxy, (lower)alkylthio, cyclohexyl, cyclopentyl, cycloheptyl, phenoxy, chlorophenoxy, bromophenoxy, (lower)alkylphenoxy, (lower)alkoxyphenoxy, benzyl, phenylethyl, phenylpropyl, phenylthio, chlorophenylthio, (lower)alkylphenylthio, (lower)alkoxyphenylthio, phenyl, chlorophenyl, bromophenyl, (lower)alkylphenyl, (lower)alkoxyphenyl, carbalkoxy, nitrile, (lower)alkyl, (lower)alkoxy, (lower)alkanoylamino, hydroxy, and sulfamyl with from one to twelve equivalents of a member selected from the group consisting of sodium borohydride and potassium borohydride to produce the corresponding α-hydroxypenicillin.

5. A process for the production of α-hydroxybenzylpenicillin which comprises contacting in a substantially aqueous medium 6-(phenylglyoxylamido)penicillanic acid with at least one equivalent of a member selected from the group consisting of sodium borohydride and potassium borohydride to produce α-hydroxybenzylpenicillin.

6. A process for the production of α-hydroxybenzylpenicillin which comprises contacting in a substantially aqueous medium at a pH greater than about 7 and at a temperature in the range of about —5° C. to about 40° C. 6-(phenylglyoxylamido)penicillanic acid with from one to twelve equivalents of a member selected from the group consisting of sodium borohydride and potassium borohydride to produce α-hydroxybenzylpenicillin.

References Cited in the file of this patent
UNITED STATES PATENTS
2,683,721    Schlesinger _____ July 13, 1954

OTHER REFERENCES

Hackh's: Chemical Dictionary, page 21 (1937), Second edition.

Morton: The Chemistry of Heterocyclic Compounds, page VI of the preface (1946).